3,177,229
METHOD FOR PREPARING PHTHALIC ANHYDRIDE
Robert J. Leak, Wappingers Falls, and Edward T. Child, Fishkill, N.Y., assignors to Texaco Inc., New York, N.Y., a corporation of Delaware
No Drawing. Filed July 9, 1962, Ser. No. 208,616
6 Claims. (Cl. 260—346.4)

This invention relates to the manufacture of phthalic anhydride, and in its specific aspect to a method for preparing phthalic anhydride by the oxidation of a suitable precursor in the presence of an improved catalytic structure.

During catalytic processing with solid particulate catalysts, the reactants are passed through a bed of porous catalyst particles, beads or pellets. In many such reactions employing organic materials at elevated temperatures, a carbonaceous deposit accumulates on the catalyst surface and in the pores and openings of the catalyst as the process proceeds under continuous operating conditions. This deposition of carbonaceous material, commonly known as fouling of the catalyst, is a function of the reactants, the reaction products, the conditions of the process, and the catalyst, and certain types of reactions may be worse offenders than others. Fouling may be particularly excessive when the reactants or product remain in contact with the catalyst for a relatively long time. When a porous catalyst is used, the reactants diffuse into the interior or central portion of the catalyst particles and may be retained for an excessive period of time whereupon decomposition of the reactants and products result in fouling the catalyst. Fouling results not only in a decrease in catalyst activity and loss in selectivity, but also results in intensification of the heat transfer problem in the catalyst thereby resulting in local overheating or "hot spots," particularly during regeneration of the catalyst.

This invention has therefore as its broad object to provide a method for preparing phthalic anhydride in the presence of a catalytic structure devoid of the foregoing disadvantages, and suitable for use in the manufacture of phthalic anhydride by the oxidation of a suitable precursor.

Heat transfer and temperature control in a catalyst bed often are difficult problems by reason of the heat of reaction which accompanies the catalytic reactions. Thus, in an exothermic reaction, for example, the heat evolved in processing may result in formation of local overheating or "hot spots" unless distributed substantially uniformly throughout the catalyst bed or otherwise dissipated from the reaction zone. Generally it is desirable or essential, to maintain the reaction temperature within a predetermined range in order to obtain the maximum yield of desired products. Local overheating and temperature variations in the catalyst bed are therefore deleterious and may result in excessive coking of the reactants, inactivation of the catalyst, complete oxidation of the reactants resulting in the formation of carbon dioxide and water, or otherwise cause undersired side reactions.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic reactions it has been proposed to incorporate pieces of metal or other suitable heat conductive solid material in the fixed catalyst bed to facilitate heat transfer to the surroundings. Heat transfer and temperature control of the catalyst bed have been achieved by employing a gaseous or liquid heat-transfer medium usually circulated through a jacket surrounding the reactor. The reactants may be diluted with steam or an inert gas as a further means of achieving temperature control. However, the known or proposed methods regarding thermal control necessitate especially designed reactors, and further may require materials and equipment in addition to that normally employed.

In certain processing operations, the temperature may be controlled within the desired range by employing low flow rates or low conversion levels to limit the rate of heat released by the reaction. However, this normally results in a corresponding decrease in yield per unit of time. Notwithstanding this precaution, uncontrollable local overheating and temperature variations in the catalyst bed may occur.

This invention has as another object to provide for use in the preparation of phthalic anhydride a catalytic structure which affords an effective means for adequately controlling the thermal conditions of the catalytic oxidation reaction thereby minimizing, or substantially eliminating, temperature variations in the catalyst bed and local overheating and fouling. Equally important, our catalytic structure is not restricted to any particular configuration, and may comprise the walls of the reactor thereby obviating the need for employing a packed column of catalyst. As a result, the quantity of active catalyst material used in our catalytic structure is greatly reduced as compared to the quantity required in conventional structures. This eliminates a substantial portion of the structural and supporting members of the reactor, permits compactness in design and decreases substantially the capital costs and operating costs. It is significant that the foregoing and other objects are realized without diminishing the flow rates of the reactants, but on the contrary, the reaction rates may be greatly increased without any appreciable decrease in product yield. These, together with other objects and advantages, will be apparent to one skilled in the art upon reading the following description.

It is known in the art that phthalic anhydride may be prepared by the catalytic oxidation of a suitable precursor. The precursor comprises an aromatic with carbon bonded substituents in the ortho position, and include, for example, naphthalene, ortho-xylene, methylnaphthalene, indane and indene. Vanadium oxide is commonly employed as the oxidation catalyst, and the reaction is carried out in the presence of oxygen or an oxygen containing gas, e.g. air. The temperature conditions for the catalytic process may vary somewhat ranging, for example, from about 650 to 950° F., when naphthalene is used as the charge and from about 900 to 1150° F. when ortho-xylene is used as charged. The pressure for the process may range from about atmospheric to 50 p.s.i.g.

In accordance with our invention, we provide an improved catalytic structure for use in the preparation of phthalic anhydride from a suitable aromatic precursor having carbon bonded substituents in the ortho position. Suitable precursors include, for example, naphthalene, methylnaphthalene, ortho-xylene, indane and indene. The catalytic structure involves broadly a substrate, preferably of extended dimensions, having an adherent film or layer of alumina formed thereon. The film of alumina deposited or formed on the substrate is sufficiently tenacious to withstand ordinary usage and is not damaged or impaired upon relatively severe abrading, jarring, etc. A catalyst comprising vanadium oxide is deposited upon the film of alumina adhering to the substrate, as explained more fully hereinbelow.

In accordance with this invention, the substrate employed in the catalytic structure is provided with an adherent film of alumina formed by contacting the substrate with a solution of an alkali metal aluminate, e.g., sodium aluminate. The substrate is preferably of extended dimensions, and is particularly of a length and geometric surface area substantially greater than that of discrete particles. The substrate employed in the structure of our invention is not restricted to any particular configuration nor to any particular material. The substrate may be formed of a metal or non-metal suitable for use in a catalytic reactor, and may include such materials as steel, stainless steel, nickel, or titanium, including sintered metal materials, or refractory or ceramic materials including, for example, high melting glass, refractory metal oxides, e.g., magnesia and silica, or refractory metal silicates or carbides. The configuration of the substrate may include bars, balls, chain, mesh, plates, saddles, sheet, tubes, wire or the like.

Although the invention is described herein in detail with reference to employing a sodium aluminate solution, it should be understood that a solution of potassium aluminate is also satisfactory for use in forming an adherent film of alumina on the substrate.

In preparing the catalytic structure the substrate is contacted with an aqueous solution of sodium aluminate whereby an adherent film of alumina is formed thereon, the resulting film being hard, firm and tenacious. X-ray diffraction analysis indicates that the alumina formed or deposited from the sodium aluminate solution is chiefly the trihydrate phase, either as the alpha or beta trihydrate phase. The particular phase initially deposited onto the substrate apepars to be largely dependent on the temperature of the sodium aluminate solution employed. Thus, solutions at about room temperature result in the formation of a film comprising about 50% by weight alpha alumina trihydrate and 50% by weight beta alumina trihydrate; whereas, employing sodium aluminate solutions at elevated temperatures, e.g., 125° F. or higher, generally results in a film comprising alpha alumina trihydrate. The phase of hydrated alumina formed on the substrate may be significant in that further transformation of the alumina may be effected where desired, upon dehydration on heating or mild calcination, as explained below in detail. However, the alumina film formed on the substrate may contain a small quantity of some other phase or phases of alumina, as well as several tenths percent sodium oxide (which may be present as sodium aluminate). It should be understood, however, that the alumina film initially deposited on the substrate may be regarded as substantially a hydrate of alumina, and is intended to embrace the film formed on the substrate from a solution of sodium aluminate, which film may undergo additional phase transformation.

The sodium aluminate solution may be obtained or prepared by any known methods. Thus, for example, aluminum pellets may be dissolved in a relatively strong solution of sodium hydroxide, or, where deemed desirable, alumina may be dissolved in an aqueous solution of sodium hydroxide. The substrate is contacted with the resulting solution of sodium aluminate, and for a sufficient period of time, whereby an adherent film of alumina is formed on the surface of the substrate. Generally, the concentration of the sodium aluminate solution should not be less than 0.5 molar, and more preferably 1 molar, in order for a film of alumina deposited or formed be of sufficient depth to be serviceable and be formed within a reasonable period of time. Generally, a solution having a concentration of about 1 to 5 molar is satisfactory. Where desired, more concentrated solutions may be employed but there appears to be no advantage in employing solutions having concentration greater than 30 molar. Although a solution of sodium aluminate at room temperature may be used, formation of the alumina film is somewhat facilitated by contacting the substrate with a solution of sodium aluminate maintained at an elevated temperature. However, as explained above, the temperature of the solution determines to a considerable extent the particular alumina phase formed. Thus, for example, in depositing a film of alpha alumina trihydrate on the substrate it is desirable to employ a solution having a temperature above 125° F., and more preferably about 175 to 212° F.

The substrate may be contacted with the solution of sodium aluminate as by immersing the substrate when in particulate form, e.g., saddles, spheres, mesh, etc., in the solution; or in forming the alumina film on the interior wall of a tube of substantial length, sodium aluminate solution is added to the tube and permitted to stand therein in a vertical position in order to provide for a film of uniform thickness. The resulting film of alumina formed on the substrate should be of sufficient thickness to provide adequate capacity for retaining the catalyst deposited thereon. To insure adequate performance under the conditions encountered in catalytic processing, however, the film of alumina formed should not be substantially thinner than about 1 mil, and preferably not less than about 10 mils, usually 10 to 100 mils being desirable.

In the preferred embodiment of this invention, the alumina in hydrate form deposited on the substrate as an adherent film is subjected to heating to drive off at least part of the water of hydration thereby resulting in the transformation to a lower state, or degree, of hydration and also to a higher density alumina. Such transformation accompanying heating is well known in the art, and may be found discussed in "Alumina Properties" by J. W. Newsome et al. (Aluminum Company of America, 1960, second revision). The temperature required in effecting transformation of the hydrate of alumina depends on such factors as pressure, atmosphere, heating rate and impurities. Thus, for example, both alpha alumina trihydrate and beta alumina trihydrate deposited from a solution of sodium aluminate, as explained above, may be dehydrated to the monohydrate phase upon mild calcining in an atmosphere of air to about 390 to 750° F. and at slightly elevated pressure. The resulting monohydrate phase may be subjected to further heating to about 1000 to 1500° F. thereby transforming it to the gamma phase. On the other hand, beta alumina trihydrate may be transferred to eta alumina upon heating in dry air at a slow rate to about 550 to 950° F. Transformation to gamma alumina or eta alumina is particularly advantageous in that these phases have a large total surface area per unit weight, the surface area being substantially higher than the amorphous forms of alumina, thereby increasing the catalytic activity, per se, and, more importantly, resulting in a carrier characterized by a high adsorptive property.

The oxidation catalyst comprising vanadium oxide may be deposited or formed on the alumina film by impregnation of the alumina film. This is accomplished by contacting the alumina coated substrate with a catalyst-containing material, generally by immersing the alumina coated substrate in a solution of a compound or salt of the catalyst. Compounds or salts found particularly useful or convenient include the water-soluble compounds such as ammonium vanadate, potassium vanadate and sodium vanadate, and the less soluble vanadium pentaoxide. When employing a solution of a vanadium compound, impregnation is usually facilitated, and a more uniform deposition is obtained, by employing a complexing agent. For this purpose, we have found it suitable to employ oxalic acid, tartaric acid, citric acid and the like. The temperature of the solution is usually at about room temperature and may range from 40 to 200° F., and more preferably from 50 to 100° F.

The alumina coated substrate, having a vanadium-containing catalyst deposited thereon, is calcined to stabilize the structure for use in the catalytic reaction and to convert the vanadium compound to its corresponding oxide. To accomplish this, the impregnated alumina film may be calcined in air at a temperature from about 500 to 1800° F., and preferably from 900 to 1600° F., and for a period of time of about 1 to 24 hours or at least for a sufficient period to convert substantially all of the vanadium to its corresponding oxide. Where required, the impregnation step and calcining operation may be repeated to assure an adequate deposit of catalyst.

Referring now in greater detail to the catalytic structure of our invention, and the attendant advantages, the substrate is initially provided with an alumina film which is relatively thin as compared to the substrate. The substrate is not restricted to any particular configuration, and may include bars, balls, chain, plates, saddles, sheet, tubes, wire, mesh, shavings, fibers or the like, the member of the substrate preferably of extended dimension desirably of not less than about 1/16 inch in its maximum dimension, and of sufficient thickness on which the alumina film may be adequately produced. Generally, an alumina film of about 10 to 100 mils is sufficient, but thicker film or thinner film may be employed where desired. The thin alumina film with the added oxidation catalyst material defines the depth of the catalyst bed, and therefore limits the extent of diffusion of the reactants through the pores and openings in the bed to this shallow depth. As a consequence, substantially all of the catalyst material is exposed to the reactants, and entrapment of the reactants in the catalys is minimized or substantially eliminated. In this manner, we readily achieve with less catalyst material a reactive capacity equal to, or greater than, that accomplished by conventional catalysts.

In a preferred embodiment of this invention, a metal is employed as the substrate of the catalytic structure thereby rendering the structure capable of operating under substantially isothermal conditions. During a catalytic process, heat transfer in the catalyst bed is readily accomplished by means of the metal substrate, which is preferably of extended dimensions. Depending on the nature of the reaction, heat may be extracted from, or supplied to, the reactor through the metal substrate thereby providing an adequate means for controlling temperature conditions in the catalyst bed. Thus, in the oxidation process for example, the metal substrate will conduct the heat to the surroundings of the reactor, and the excess heat extracted therefrom preferably by means of a cooling medium employed in heat exchange relation with the reactor.

In another embodiment of our invention, the catalytic structure is provided in the form of a tube of relatively small inside diameter. The inside diameter of the tube, in general, may range from about 0.05 to 0.75 inch, and in some cases up to 2 inches, but is dependent upon the materials undergoing reaction and the capacity of the pumping mechanism to accomplish sufficient turbulence. At least one surface or wall of the tube, and preferably the interior wall of the tube, is provided with an alumina film as described above, and added oxidation catalyst material is deposited thereon. The tube through which the reactants pass is preferably of a continuous length sufficient to accomplish the desired catalytic reaction in economic yields, but may be coiled to conserve space. The length of the tube may depend to some extent upon the reaction contemplated, and therefore may be readily determined by one skilled in the art. The wall of the reactor provides adequate support and mechanical strength for the catalyst, and thereby affords a substantially self-sustaining structure. Packed reaction columns are eliminated as are many of the structural and supporting features employed in a conventional catalytic reactor.

It will be observed that when a metal tube is employed, the tube provides an adequate means to control the temperature or heat transfer to or from the catalyst. The metal wall, being a good heat conductor, may be employed as a heat exchanger notwithstanding the relatively thin alumina film. A suitable heat exchange medium may be applied to the exterior wall of the metal tube, for example. During processing, the heat evolved in the catalyst bed is readily conducted by the wall of the tube to the surroundings where it is absorbed and dissipated by the heat exchange medium. It should be understood that in an economic and commercial operation, a number of the catalytic tubes may be housed in parallel in a single unit and arranged in contacting relation with a heat exchange medium.

It is of further significance that in the catalytic tube having a relatively small inside diameter, turbulent flow of the reactants passing through the tube is readily maintained. As a consequence, near maximum reaction rates are achieved. In addition, the catalytic structure of our invention markedly reduces the residence time of the reactants in the reactor, as explained above. Consequently, the reactor may be operated at high temperatures, or optimum temperatures, or more importantly, in many cases at higher temperatures and faster reaction rates than those normally encountered in a conventional reactor, without danger of excessive coking or fouling of the catalyst.

Our invention is further illustrated by the following example:

A sodium aluminate solution was prepared by dissolving 305 grams of sodium hydroxide in 5 liters of water contained in a battery jar, and adding thereto 200 grams of aluminum pills. Two hundred-fifty grams of chrome steel chips measuring about 1/8" x 1/4" were retained in a stainless steel sieve which was immersed in the solution. The solution was maintained at about 140 to 180° F. by means of a steam plate for about 6 hours. The battery jar was removed from the steam plate, and the solution allowed to stand until a precipitate began to form on the side walls and bottom of the battery jar. The chips retained in the sieve were then agitated by shaking about every 1/2 hour over a 2 hour period and then permitted to remain in the solution for 16 hours in order that the chips might be uniformly coated. The chips were then removed from the solution, and washed thoroughly with tap water and then with distilled water. The chips having an adherent film of alumina formed thereon were dried gradually to avoid cracking, first at 300° F. for 1 hour, then at 500° F. for 1 hour, at 1000° F. for 1 hour and finally at 1600° F. for 3 hours. As a result of the heating, the alumina film comprised essentially gamma alumina. The total weight of the coated chips was 280 grams, the alumina film comprising 10.7 percent of the total weight.

The alumina film formed on the chrome steel chips was impregnated with a vanadium oxide catalyst as follows:

The solution of catalyst-containing material was prepared by first dissolving 300 grams of tartaric acid in 800 milliliters of water. To this solution was added 167 grams of ammonium vanadate, and the resulting solution was diluted to 1000 milliliters. The above prepared chips were retained in a beaker, and the solution, having a temperature of about 75° F. was poured over the chips and the solution then drained from the beaker. The treated chips were heated in air at 300° F. for 1 hour. This procedure was repeated 9 times. After the final soaking, the treated chips were heated in air at 500° F. for 1 hour, then at 1000° F. for 1 hour, and subsequently at 1500° F. for 1 hour.

The prepared chips having the catalyst material impregnated thereon were used in the oxidation of ortho-xylene for the preparation of phthalic anhydride. The run was conducted at 900° F., a pressure of 5 p.s.i.g., and a space velocity of 22,600 cc. per hour per cc. of catalyst with a feed consisting of 0.45 mol percent ortho-xylene in air. The phthalic anhydride yield was 53 grams per 100 grams of ortho-xylene charge.

Having described our invention, we claim:

1. A method for preparing phthalic anhydride which comprises contacting a precursor comprising an aromatic hydrocarbon with carbon-bonded substituents in the ortho position at an elevated temperature and in the presence of an oxygen-containing gas with a catalytic structure comprising a substrate, an adherent film of gamma alumina formed on said substrate by contacting said substrate with an aqueous solution of an alkali metal aluminate and heating the resulting film of hydrated alumina deposited on said substrate to a temperature in the range of 1000 to 1500° F. thereby transforming said resulting film to gamma alumina, and vanadium oxide deposited upon said resulting alumina film.

2. A method according to claim 1 wherein said alkali metal aluminate is sodium aluminate.

3. A method according to claim 1 wherein said substrate is a metal tube with said alumina film on its inner wall.

4. A method according to claim 1 wherein said precursor is ortho-xylene.

5. A method according to claim 1 wherein said substrate comprises chrome steel chips.

6. A method according to claim 1 wherein said solution of alkali metal aluminate has a concentration of not less than 0.5 molar.

References Cited in the file of this patent
UNITED STATES PATENTS

| | | |
|---|---|---|
| 2,209,908 | Weiss | July 30, 1940 |
| 2,911,359 | Hansford | Nov. 3, 1959 |
| 2,965,583 | Houdry et al. | Dec. 20, 1960 |